United States Patent [19]

Williams et al.

[11] 3,917,707

[45] Nov. 4, 1975

[54] SUPPRESSION OF 1,2-DIAMINOCYCLOHEXANE FORMATION DURING PRODUCTION OF HEXAMETHYLENEDIAMINE

[75] Inventors: John Ronald Williams, Victoria, Tex.; Terry Gene Lenz, Fort Collins, Colo.

[73] Assignee: E. I. Du Pont de Nemours & Company, Wilmington, Del.

[22] Filed: July 31, 1974

[21] Appl. No.: 493,743

[52] U.S. Cl. ...... 260/583 K; 260/563 D; 260/583 P; 260/583 M
[51] Int. Cl.² ........................................ C07C 87/14
[58] Field of Search ........ 260/583 K, 583 P, 563 D, 260/583 M

[56] References Cited
UNITED STATES PATENTS

| | | | |
|---|---|---|---|
| 3,061,644 | 10/1962 | Fierce et al. | 260/583 K |
| 3,117,162 | 1/1964 | Rylander et al. | 260/583 K |
| 3,152,184 | 10/1964 | Levering et al. | 260/583 K |
| 3,235,600 | 2/1966 | Evans | 260/583 K |
| 3,773,834 | 11/1973 | Bivens et al. | 260/583 K |

Primary Examiner—Arthur P. Demers

[57] ABSTRACT

In the process of preparing hexamethylenediamine by the catalytic hydrogenation of adiponitrile in the presence of ammonia contacting the adiponitrile during hydrogenation with a compound selected from the group consisting of RCOM, where R is selected from the group consisting of hydrogen and an alkyl radical having from 1 to 3 carbon atoms and M is selected from the group consisting of the radicals OH, $NH_2$, $ONH_4$, ONa and OR' where R' is selected from the group consisting of alkyl radicals having from 1 to 3 carbon atoms, glyoxal and carbon monoxide.

10 Claims, No Drawings

SUPPRESSION OF 1,2-DIAMINOCYCLOHEXANE FORMATION DURING PRODUCTION OF HEXAMETHYLENEDIAMINE

BACKGROUND OF THE INVENTION

The process of the present invention relates to the preparation of hexamethylenediamine. More specifically, the present invention relates to the reduction of the impurity, 1,2-diaminocyclohexane, in hexamethylenediamine produced by the catalytic hydrogenation of adiponitrile.

PRIOR ART

The preparation of hexamethylenediamine (HMD) by the catalytic hydrogenation of adiponitrile (ADN) in the presence of ammonia is known in the art. One such method is U.S. Pat. No. 3,471,563.

In the manufacture of hexamethylenediamine by the catalytic hydrogenation of adiponitrile several by-products are produced. One of the by-products produced which is the most difficult to separate from the crude hexamethylenediamine is 1,2-diaminocyclohexane. The boiling point of 1,2-diaminocyclohexane is close enough to hexamethylenediamine to present a difficult problem to the purification of hexamethylenediamine by fractional distillation. Additionally the distillation equipment required to remove 1,2-diaminocyclohexane from crude hexamethylenediamine is extremely costly to operate. Such a distillation step results in losses of hexamethylenediamine and constitutes a bottleneck in the refining operation and overall production of hexamethylenediamine. The presence of 1,2-diaminocyclohexane (DCH) in the hexamethylenediamine at the normal level has a deleterious effect on the properties of the nylon produced therefrom. The presence of 1,2-diaminocyclohexane in the production of polyhexamethylene adipamide results in a lower molecular weight polymer having irregular tensile strength, poor color characteristics, poor dyeability and other inferior chemical and physical properties.

Hexamethylenediamine can be produced by a number of methods. However, none of these methods result in the production of hexamethylenediamine which is free from products of side reactions. One process used to produce hexamethylenediamine (HMD) is described in U.S. Pat. No. 3,471,563. However, the process for preparing HMD by the catalytic hydrogenation of adiponitrile in the presence of ammonia is well known in the art.

In U.S. Pat. No. 3,235,600 the DCH content of HMD is reduced by the use of inorganic or organic carbonates, organic and inorganic carbamates and carbon dioxide. The present invention involves additives that suppress DCH in HMD or reduce DCH and do not involve carbon dioxide or the above carbonates or carbamates.

Summary of the Invention

Now it has been found that the level of 1,2-diaminocyclohexane in hexamethylenediamine produced by the catalytic hydrogenation of adiponitrile can be reduced by use of the additive compounds of the present invention. Thus according to the present invention the impurity level of 1,2-diaminocyclohexane in hexamethylenediamine produced by the catalytic hydrogenation of adiponitrile was reduced by contacting the adiponitrile with a compound selected from the group consisting of RCOM, where R is selected from the group consisting of hydrogen and an alkyl radical having from 1 to 3 carbon atoms and M is selected from the group consisting of the radicals OH, $NH_2$, $ONH_4$, ONa and OR' where R' is selected from the group consisting of alkyl radicals having from 1 to 3 carbon atoms, glyoxal and carbon monoxide, wherein the mol percent of the RCOM and glyoxal is from 0.2 to 2.4, preferably 0.50 to 1.50, and the carbon monoxide is from 0.075 to 0.150, preferably 0.100 to 0.140 based on the adiponitrile.

The use of the additives of the present invention does not substantially affect the activity or rate of hydrogenation and in the case of the preferred RCOM type additives the rate appears to be unchanged or improved.

Thus in accordance with the invention adiponitrile, ammonia and hydrogen together with an additive compound of the present invention are passed over or through a hydrogenation catalyst under hydrogenation temperatures and pressures thereby forming crude hexamethylenediamine that contains reduced quantities of 1,2-diaminocyclohexane.

The hydrogenation temperature for the process of the present invention may be between 25°C. and 210°C. and the hydrogenation pressure may be maintained between 25 and 10,000 pounds per square inch or higher with the preferred temperature being in the range of 125°C. to 170°C. and the preferred pressure being in the range of 4,000 to 6,000 psig. In the practice of the invention it is preferred generally to carry out the hydrogenation at the lowest temperature and hydrogen pressure at which hydrogen is absorbed at a reasonably rapid rate.

The hydrogenation of adiponitrile to hexamethylenediamine may be accomplished by the use of various hydrogenation catalysts. Representative examples of such catalysts include nickel, cobalt, copper, zinc, platinum, palladium, iron, rubidium, ruthenium, Raney catalysts and the like. The hydrogenation catalysts may be in the form of free metals or in the form of compounds such as oxides or salts. The hydrogenation catalysts may be employed in conjunction with known promoters and/or supports.

These above mentioned catalytic materials are used preferably in a finely divided form and may be deposited on a porous supporting means such as pumice, kieselguhr, alumina gel and silica gel. Catalyst powders are prepared conveniently for use in the hydrogenation process by compressing the catalyst into pellets or brickets of suitable size. Stabilized catalysts containing a substantial proportion of oxide, catalysts comprising the carbonate, oxide or hydroxide of the hydrogenating metal deposited on an inert porous support, and catalysts in which the hydrogenating metal is combined with a nonreducible oxide are preferably reduced in a stream of hydrogen-containing gas prior to exposure to the reaction compounds.

The additive compounds of the present invention may be selected from RCOM, glyoxal and carbon monoxide where R in the formula RCOM is hydrogen or alkyl of 1 to 3 carbon atoms and M is OH, $NH_2$, $ONH_4$, ONa or OR' where R' is an alkyl radical of 1 to 3 carbon atoms. Thus the compounds represented by the formula RCOM may be amides, acids, salts and esters. Representative examples of RCOM compounds include methyl formate, ethyl formate, propyl formate, formamide, formic acid, ammonium formate, sodium formate, acetic acid, acetamide, ammonium acetate, sodium acetate, methyl acetate, ethyl acetate, propyl acetate, propionic acid, propionamide, ammonium propionate, sodium propionate, methyl propionate, ethyl propionate, propylpropionate, butyric acid, butyramide, ammonium butyrate, sodium butyrate, methyl butyrate, ethyl butyrate, propyl butyrate, and the like.

The additive compounds of the present invention which suppress the formation of 1,2-diaminocyclohexane (DCH) present in hexamethylenediamine (HMD) produced by the catalytic hydrogenation of adiponitrile (ADN) in the presence of ammonia may be selected from compounds of the general formula ROM (where R and M are as defined above), glyoxal and carbon monoxide. The amounts of the additives may vary somewhat depending on the additive selected. When carbon monoxide is used as the amount used approaches or goes beyond 0.150 mol percent the reduction of DCH tends to be overshadowed by the reduction in rate due to poisoning of the catalyst. Thus greater amounts of carbon monoxide will further reduce the DCH content of the crude HMD. Among the preferred compounds represented by the above formula RCOM, the most preferred is formamide. The preferred compounds of the present invention, those represented by the formula RCOM as defined above, not only reduce the DCH content of the HMD but also either result in an improved rate or no rate reduction when compared to no additive being used.

The weight ratio of liquid ammonia to adiponitrile in the process of preparing adiponitrile may be from 1:1 to 10:1; however, greater amounts of ammonia relative to adiponitrile can be used but practically are not desirable for the reason that separation problems arise with greater levels of ammonia. The preferred level of ammonia to adiponitrile is 4:1.

The following examples are provided to further illustrate the present invention. The weight percent and mol percent of the additives of the present invention are based on the adiponitrile used.

The activity of the hydrogenation catalyst in the following examples was the rate at which it promotes the hydrogenation of adiponitrile to hexamethylenediamine. This rate of hydrogenation was monitored by measuring the amount of hydrogen used per unit time during the reaction. The amount of hydrogen used was determined by continuously recording the pressure of a fixed volume of hydrogen feed gas. The effect of various additives were thus compared to each other at a relative basis of hydrogen usage in gram moles of hydrogen per minute per gram of catalyst. The runs were terminated when the hydrogen usage was very slow or after a 1,400 or 1,500 psig pressure reduction in the feed tank occurred.

EXAMPLE 1

In a dry nitrogen atmosphere 70.0 grams of adiponitrile (ADN) was weighed into a 250 ml. beaker. To this was added 35.0 grams of reduced iron catalyst, according to the teaching of U.S. Pat. No. 3,696,153. The ADN and catalyst were transferred to an Aminco high-pressure rocking reactor having a volume of 1.15 liters. The reactor was then sealed and evacuated. To the ADN-catalyst mixture was then added 280 grams of anhydrous ammonia by forcing it into the rocking assembly using 300 psi hydrogen. The mixture was agitated by a rocking motion while the reactor was heated to 150°C. The hydrogenation of adiponitrile to hexamethylenediamine was initiated by pressurizing the reactor with hydrogen to 5,000 psig and maintaining the pressure at 5,000 psig during the entire reaction period. The extent and rate of hydrogenation was determined by measuring the hydrogen fed to the reaction from a feed tank initially at 8,000 psig using the appropriate corrections for temperature and compressibility of hydrogen. The reaction temperature was maintained at 150° ± 2°C. during the two-hour reaction time. The reaction was considered to be complete when no hydrogen was used for approximately 10 minutes. After cooling to 135°C. the rocking motion was stopped and the excess hydrogen and ammonia were vented and the pressure reduced to one atmosphere. The activity or rate was 1.15. The entire sample of this crude hexamethylenediamine product was removed from the reactor. Laboratory analysis using a calibrated gas chromatograph showed 0.33% 1,2-diaminocyclohexane in the crude hexamethylenediamine product.

EXAMPLE 2

The procedure of example 1 was followed except that a new reaction mixture was prepared by adding 0.53% by weight or 0.37 grams of glacial acetic acid (0.95 mol %) to 70 grams of adiponitrile prior to its being mixed with the liquid anhydrous ammonia. Analysis of the crude hexamethylenediamine produced showed 0.20 weight percent 1,2-diaminocyclohexane in the crude hexamethylenediamine product or a 39.4% reduction in the 1,2-diaminocyclohexane produced in example 1.

EXAMPLE 3

Following the procedure and amounts of example 1 the amount of 1,2-diaminocyclohexane present in the hexamethylenediamine (HMD) was determined as a control. HMD was prepared using the portion indicated in example 1 of the same ADN and catalyst by the procedure shown in example 1 except that 0.38% by weight (0.89 mol %) by weight of formic acid was added to the adiponitrile as the 1,2-diaminocyclohexane suppressant and laboratory analysis of the crude hexamethylenediamine produced showed 0.21 weight percent 1,2-diaminocyclohexane or a 45% reduction in the 1,2-diaminocyclohexane produced without the formic acid. The activity or rate was 1.43 as compared to 1.15 without formic acid. A repeat of this run and control yielded the results given in Table I under the same conditions except as indicated.

TABLE I

| Catalyst (grams) | Temp. (°C) | Formic Acid (Wt %) | (Mol %) | Activity* or Rate | DCH (Wt %) | Percent Reduction in DCH |
|---|---|---|---|---|---|---|
| 51 | 130 | 0 | 0 | 0.5 | 0.21 | — |
| 51 | 130 | 0.5 | 1.18 | 0.5 | 0.15 | 28.6 |
| 35 | 150 | 0 | 0 | 1.2 | 0.32 | — |
| 35 | 150 | 0.38 | 0.89 | 1.4 | 0.21 | 0 |
| 35 | 170 | 0 | 0 | 1.3 | 0.44 | — |
| 35 | 170 | 0.38 | 0.89 | 1.6 | 0.38 | 13.6 |
| 35 | 150 | 0.38 | 0.89 | 1.14 | 0.23 | 47.8 |

TABLE I-continued

| Catalyst (grams) | Temp. (°C) | Formic Acid (Wt %) | Formic Acid (Mol %) | Activity* or Rate | DCH (Wt %) | Percent Reduction in DCH |
| --- | --- | --- | --- | --- | --- | --- |
| 35 | 150 | 0 | 0 | 1.16 | 0.30 | — |
| 35 | 150 | 0.76 | 1.78 | 1.09 | 0.24 | 20 |

$$*\text{Rate} = \frac{\text{gram-mole of hydrogen used}}{\text{minutes, grams of catalyst}} \times 10^3$$

EXAMPLE 4

Following the procedure and amounts of example 1, the amount of 1,2-diaminocyclohexane present in the hexamethylenediamine (HMD) was determined as a control. HMD was prepared using the portion indicated in example 1 of the same ADN catalyst by the procedure shown in example 1 except that 0.30 weight percent (0.56 mol %) glyoxal was added to the adiponitrile as the 1,2-diaminocyclohexane suppressant. Laboratory analysis of the crude hexamethylenediamine product showed 0.23 weight percent 1,2-diaminocyclohexane or a 30% reduction in the 1,2-diaminocyclohexane produced without glyoxal. The activity or rate was 1.59 as compared to 1.62 without glyoxal.

EXAMPLE 5

Following the procedure and amounts of example 1 the amount of 1,2-diaminocyclohexane present in the hexamethylenediamine (HMD) was determined as a control. HMD was prepared using the portion indicated in example 1 of the same ADN and catalyst by the procedure of example 1 except that 0.44 weight percent (0.75 mol %) ammonium formate was added to the adiponitrile as the 1,2-diaminocyclohexane suppressant. Laboratory analysis of the crude hexamethylenediamine product showed 0.20 weight percent 1,2-diaminocyclohexane which amounts to a 47.4% reduction over the control without ammonium formate. The activity or rate was 1.93 as compared to 1.37 without ammonium formate.

EXAMPLES 6–10

Following the procedure and amounts recited in example 1 the amount of 1,2-diaminocyclohexane present in HMD was determined as a control. HMD was prepared using the procedure and portions indicated in example 1 of the same ADN and catalyst but using the amount of methyl formate indicated below in Table II.

TABLE II

| Ex. | Methyl Formate (Wt %) | Methyl Formate (Mol %) | 1,2-Diaminocyclohexane in Crude HMD (Wt %) | Activity or Rate | Reduction in 1,2-Diaminocyclohexane (%) |
| --- | --- | --- | --- | --- | --- |
| 6 | 0 | 0 | 0.63 | 1.34 | — |
| 7 | 0.36 | 0.66 | 0.42 | 1.28 | 33.3 |
| 8 | 0.57 | 1.04 | 0.41 | 1.49 | 34.9 |
| 9 | 0.79 | 1.44 | 0.32 | 1.27 | 49.2 |
| 10 | 0.93 | 1.74 | 0.31 | 1.31 | 50.8 |

Beyond about 1.44 mol percent the percent reduction in DCH did not significantly change.

EXAMPLES 11–17

The procedure and amounts recited in example 1 were used and the amount of 1,2-diaminocyclohexane present in the HMD produced was determined as a control. Using the same ADN and catalyst HMD was produced with the additive and amounts shown below in Table III.

TABLE III

| Ex. | Formamide (Wt %) | Formamide (Mol %) | 1,2-Diaminocyclohexane in Crude HMD (Wt %) | Activity or Rate | Reduction in 1,2-Diaminocyclohexane (%) |
| --- | --- | --- | --- | --- | --- |
| 11 | 0 | 0 | 0.63 | 1.34 | — |
| 12 | 0.23 | 0.055 | 0.41 | 1.40 | 34.9 |
| 13 | 0.32 | 0.76 | 0.40 | 1.19 | 36.5 |
| 14 | 0.38 | 0.91 | 0.46 | 1.28 | 27.0 |
| 15 | 0.55 | 1.32 | 0.37 | 1.35 | 41.3 |
| 16 | 0.61 | 1.46 | 0.32 | 1.41 | 49.2 |
| 17 | 0.93 | 2.23 | 0.32 | 1.48 | 49.2 |

At mol percent of formamide beyond about 1.46 the percent reduction of DCH was either nonsignificant or unchanged.

EXAMPLES 17–25

The procedures and amounts recited in example 1 were used and the amount of 1,2-diaminocyclohexane present in the HMD produced was determined as a control. Using the same ADN and catalyst HMD was produced with the additive of carbon monoxide. The carbon monoxide was added to the ADN in the reaction and then followed by the ammonia addition indicated to push all of the carbon monoxide into the reactor. Table IV summarizes the data.

TABLE IV

| Ex. | Volume of CO at 1 atmos. (cc) | Carbon Monoxide (Wt %) | Carbon Monoxide (Mol %) | 1,2-Diaminocyclohexane in Crude HMD (Wt %) | Activity or Rate | Reduction in 1,2-Diaminocyclohexane (%) |
|---|---|---|---|---|---|---|
| 18 | 0 | 0 | 0 | 0.63 | 1.34 | 0 |
| 19 | 3.5 | 0.006 | 0.022 | 0.60 | 1.03 | 5 |
| 20 | 7.0 | 0.011 | 0.044 | 0.49 | 1.09 | 22 |
| 21 | 8.4 | 0.014 | 0.053 | 0.58 | 1.06 | 8 |
| 22 | 9.4 | 0.015 | 0.060 | 0.54 | 1.15 | 14 |
| 23 | 11.9 | 0.020 | 0.075 | 0.57 | 0.83 | 10 |
| 24 | 14.0 | 0.023 | 0.089 | 0.49 | 1.04 | 22 |
| 25 | 30.0 | 0.049 | 0.190 | 0.41* | 0.95 | 35 |

*The rate of reaction was reduced from a comparative level of 1.34 without an addition to 0.95 indicating an attack on the catalyst by the carbon monoxide.

The exact reason for the variation of the DCH levels observed in the use of different batches of catalyst and adiponitrile is not known. One possible cause for the DCH variation may be related to impurities in the adiponitrile or to composition or structural changes in the catalyst from lot to lot.

Hexamethylenediamine is a well known compound that is used to produce polyamides by condensing with dibasic acids.

The present invention presents advantages over previously known methods of manufacturing hexamethylenediamine (HMD). The HMD of the present invention has greatly reduced concentrations of DCH. The HMD produced according to the process of the present invention reduces the DCH concentration from 20 to 50% over that HMD prepared without the additives of the present invention.

We claim:

1. In the preparation of hexamethylenediamine by the catalytic hydrogenation of adiponitrile in the presence of ammonia at a temperature from 25°C. to 210°C. and a pressure of from 25 to 10,000 psig, the improvement comprising contacting the adiponitrile during said hydrogenation with a compound selected from the group consisting of RCOM, where R is selected from hydrogen and alkyl having 1 to 3 carbon atoms and M is selected from the radicals OH, $NH_2$, $ONH_4$, ONa and OR' wherein R' is selected from alkyl radicals having 1 to 3 carbon atoms, glyoxal and carbon monoxide, the mol percent of RCOM and glyoxal being from 0.2 to 2.4 and carbon monoxide being from 0.075 to 0.150, based on the adiponitrile, and recovering crude hexamethylenediamine with reduced 1,2-diaminocyclohexane.

2. The process of claim 1 wherein the adiponitrile is contacted with RCOM.

3. The process of claim 1 wherein the adiponitrile is contacted with glyoxal.

4. The process of claim 1 wherein the adiponitrile is contacted with carbon monoxide.

5. The process of claim 2 wherein RCOM is formamide.

6. The process of claim 1 wherein the amount of RCOM and glyoxal is 0.50 to 1.50 mol percent and carbon monoxide is 0.10 to 1.40 based on the adiponitrile.

7. The process of claim 6 wherein the adiponitrile is contacted with RCOM.

8. The process of claim 7 wherein the RCOM is formamide.

9. The process of claim 6 wherein the adiponitrile is contacted with glyoxal.

10. The process of claim 6 wherein the adiponitrile is contacted with carbon monoxide.

* * * * *